United States Patent
Reynolds et al.

(10) Patent No.: US 8,561,588 B2
(45) Date of Patent: Oct. 22, 2013

(54) ENGINE STOP/START SYSTEM AND METHOD OF OPERATING SAME

(75) Inventors: Michael G. Reynolds, Troy, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 1016 days.

(21) Appl. No.: 12/203,353

(22) Filed: Sep. 3, 2008

(65) Prior Publication Data
US 2009/0224557 A1 Sep. 10, 2009

Related U.S. Application Data

(60) Provisional application No. 61/034,657, filed on Mar. 7, 2008.

(51) Int. Cl.
*F02N 11/08* (2006.01)

(52) U.S. Cl.
USPC .................. 123/179.3; 290/38 R; 123/179.25

(58) Field of Classification Search
USPC ........ 290/28 R, 38 E, 38 R; 123/179.3, 179.4
See application file for complete search history.

(56) References Cited

U.S. PATENT DOCUMENTS

| | | | | |
|---|---|---|---|---|
| 4,415,812 A | * | 11/1983 | Griffith et al. | 290/38 R |
| 6,354,257 B1 | * | 3/2002 | Marshall et al. | 123/179.3 |
| 6,634,332 B2 | * | 10/2003 | Saito et al. | 123/179.3 |
| 6,651,603 B2 | * | 11/2003 | Osada et al. | 123/179.3 |
| 6,763,735 B2 | * | 7/2004 | Siems et al. | 123/179.25 |
| 6,817,329 B2 | * | 11/2004 | Buglione et al. | 123/179.4 |
| 7,150,253 B2 | * | 12/2006 | Itou et al. | 123/179.3 |
| 7,218,010 B2 | | 5/2007 | Albertson et al. | |
| 7,275,509 B2 | * | 10/2007 | Kassner | 123/179.25 |
| 7,401,585 B2 | * | 7/2008 | Shirataki | 123/179.25 |
| 7,665,438 B2 | * | 2/2010 | Hirning et al. | 123/179.3 |
| 2006/0181084 A1 | * | 8/2006 | Albertson et al. | 290/38 R |
| 2008/0127927 A1 | | 6/2008 | Hirning et al. | |
| 2008/0162007 A1 | * | 7/2008 | Ishii et al. | 123/179.3 |

FOREIGN PATENT DOCUMENTS

| | | |
|---|---|---|
| CN | 1161405 A | 10/1997 |
| CN | 1281095 A | 1/2001 |
| DE | 19702932 A1 | 7/1998 |
| DE | 102005004326 A1 | 2/2006 |

OTHER PUBLICATIONS

German Office Action, dated Jun. 29, 2011, from German Patent Office, for Application No. 102009011628.1, 5 pages.

* cited by examiner

*Primary Examiner* — Stephen K Cronin
*Assistant Examiner* — Arnold Castro

(57) ABSTRACT

A method of operating an engine stop/start system includes connecting an armature of a starter motor to the engine through an overrunning clutch when the engine changes a rotational direction.

7 Claims, 3 Drawing Sheets

ENGINE STOP/START SYSTEM AND METHOD OF OPERATING SAME

CROSS-REFERENCE TO RELATED APPLICATIONS

This application claims the benefit of U.S. Provisional Application No. 61/034,657, filed on Mar. 7, 2008. The disclosure of the above application is incorporated herein by reference.

FIELD

The present disclosure relates to internal combustion engines, and more particularly to engine stop/start systems for preventing crankshaft reversal at engine stop.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

An internal combustion engine generally includes multiple cylinders that operate sequentially in four strokes: intake stroke, compression stroke, combustion stroke and exhaust stroke. When the engine stops, one of the cylinders may be in a compression stroke (i.e., where the gas charge is compressed). The compressed charge may push the cylinder down when the engine stops, causing the crankshaft to rotate in a reverse direction. If the reverse rotation of the crankshaft is not detected, the final rest position of the crank and cam shafts may be difficult to discern, thus making restarting of the engine more difficult.

Sensors may be used to monitor angular movement of the crankshaft but most often cannot determine whether a reverse rotation of the crankshaft has occurred. Upon restarting the engine, it may take an entire rotation of the crankshaft to determine the actual crankshaft angular position. As a result, the operation of the engine may be delayed when re-starting.

SUMMARY

Accordingly, a method of operating an engine stop/start system includes connecting an armature of a starter motor to the engine when the crankshaft changes rotational direction from the normal direction.

In other features, the method includes connecting the armature of the starter motor to the engine by using an overrunning clutch. The overrunning clutch is engaged when the engine starts to rotate in a reverse direction.

An engine stop/start control system includes an engine speed sensor, an engine damping module, and a solenoid control module. The engine speed sensor measures an engine speed. The engine damping module communicates with the engine speed sensor and is activated after the engine is commanded to stop. The solenoid control module controls a solenoid to couple a starter motor pinion gear to an engine when the engine damping module determines that the engine is slowed to a predetermined engine speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is in no way intended to limit the disclosure, its application, or uses. It should be understood that steps within a method may be executed in different order without altering the principles of the present disclosure. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A method of operating an engine stop/start system according to the present disclosure includes connecting an armature of a starter motor to the engine through an overrunning clutch when the engine changes a rotational direction from the normal direction. A starter motor that includes the overrunning clutch is coupled to the engine before an engine speed becomes zero. The overrunning clutch is disengaged when the engine still runs in a forward direction and is engaged when the crankshaft changes the rotational direction from the normal direction. At this juncture, the armature does not rotate and does not produce torque. The engaged overrunning clutch connects the armature of a starter motor to the engine only when the starter motor produces more torque at the pinion gear than the engine crankshaft is applying to the pinion gear. If the crankshaft starts to rotate in the reverse direction, the armature of the starter motor applies both a frictional and an inertial load at the pinion gear to inhibit reverse rotation of the crankshaft.

Figure 1:
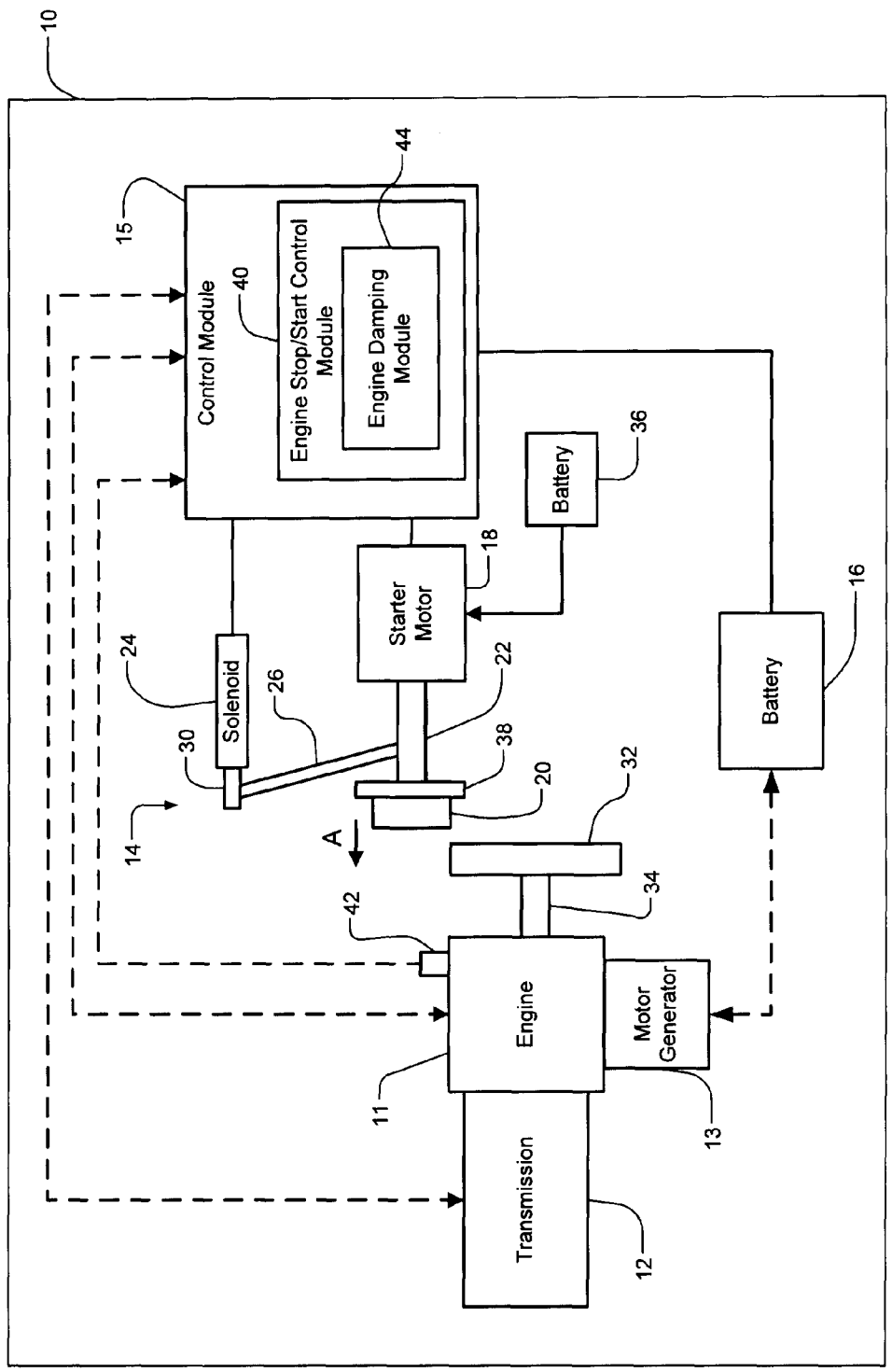
FIG. 1 is a block diagram of a hybrid vehicle that includes an engine stop/start system in accordance with the teachings of the present disclosure.

Referring now to FIG. 1, a hybrid vehicle 10 includes an engine 11, a transmission 12, a motor generator 13, an engine stop/start system 14 and a control module 15. The engine 11 communicates with the transmission 12 and provides rotational power to the transmission 12. The motor generator 13 may be driven by the engine 11 and provides charging current to a first battery 16. The motor generator 13 converts electric power from the battery 16 to mechanical power. The mechanical power is applied to an input shaft of the engine 11. The transmission 12 transmits power from the engine 11 and the motor generator 13 to provide power to a drive axle (not shown). The engine 11 and motor generator 13 may provide propulsion simultaneously or independently.

The engine stop/start system 14 includes a starter motor 18, a pinion gear 20 coaxially mounted to an armature shaft 22 of the starter motor 18, a solenoid 24, a shift lever 26. One end of the shift lever 26 is mounted to a plunger 30 of the solenoid 24 and another end is mounted to a collar (not shown) on the armature shaft 22 of the motor 18.

To start the engine 11, the solenoid 24 is actuated to move the pinion gear 20 in a direction A parallel to the axis of the armature shaft 22. The pinion gear 20 engages a flywheel ring gear 32 that is mounted to a crankshaft 34 of the engine 11. Thereafter, the starter motor 18 may be powered by a second battery 36 to rotate the pinion gear 20. The pinion gear 20 in turn drives the flywheel ring gear 32 to start the engine 11. A mechanical overrunning clutch 38 is provided adjacent to the pinion gear 20 and is mounted on the armature shaft 22. An overrunning clutch is a one-way torque transmission device that transmits torque in a single direction and that disengages a drive shaft from a driven shaft when the driven shaft overruns (i.e., rotates faster than) the drive shaft.

The overrunning clutch 38 serves to break a driving connection between the pinion gear 20 and an armature (not shown) of the starter motor 18 when the crankshaft 34 of the engine 11 reaches a rotational speed greater than that of the pinion gear 20. By breaking the driving connection between the pinion gear 20 and the armature of the starter motor 18 when the pinion gear 20 is still rotating, the armature of the starter motor 18 is prevented from being driven by the engine 11 at a higher speed. After the engine 11 is started, the solenoid 24 may be deactivated so that the shift lever 26 may move the pinion gear 20 back to its original position. Consequently, the pinion gear 20 is disengaged from the flywheel ring gear 32 and the engine 11.

The control module 15 receives various inputs from on-vehicle sensors (not shown), including, but not limited to, engine speed (RPM), start/stop requests, and vehicle speed. The control module 15 processes the inputs to determine a desired state of the engine stop/start system 14. The control module 15 includes an engine stop/start control module 40 that communicates with the engine stop/start system 14 and a speed sensor 42. The engine stop/start control module 40 controls the operation of the engine stop/start system 14 based on a stop request and a start request. The engine stop/start control module 40 controls the engine stop/start system 14 to provide a load to the crankshaft 34 when the crankshaft 34 tries to change its rotational direction.

Figure 2:
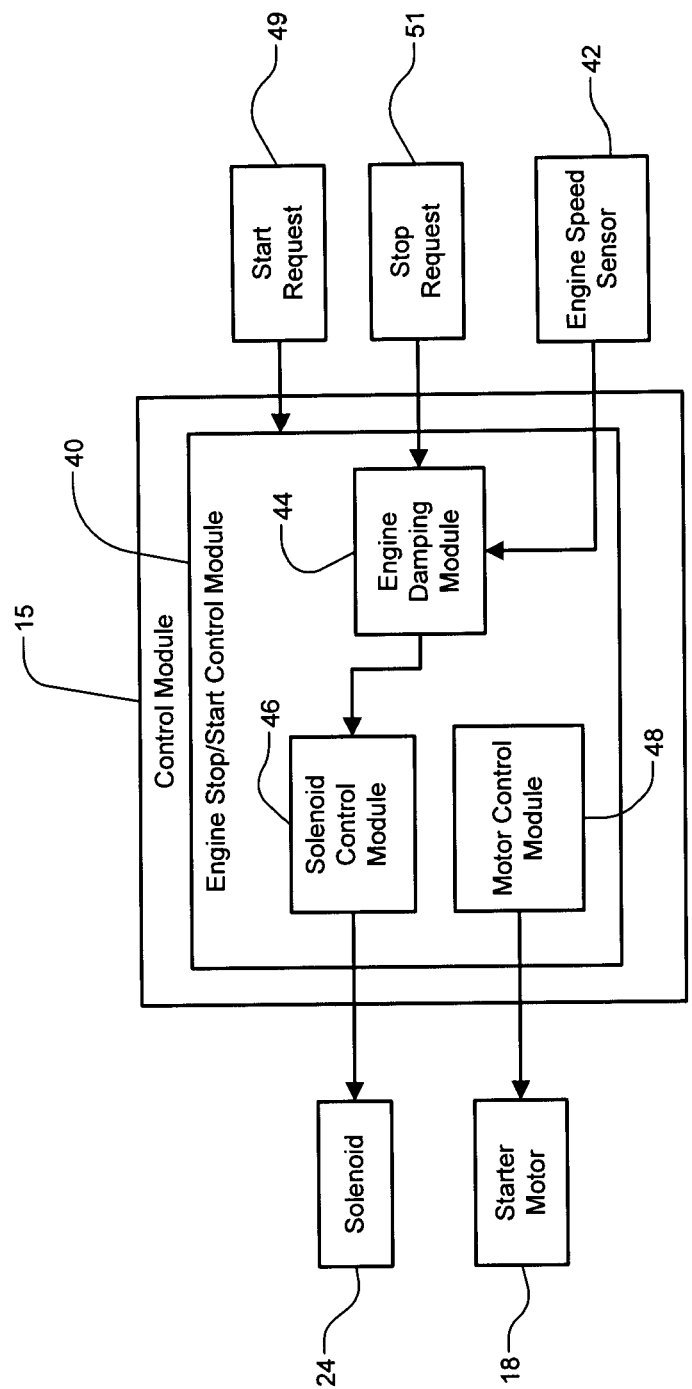
FIG. 2 is a block diagram of a control module that controls an engine stop/start system in accordance with the teachings of the present disclosure.

Referring to FIG. 2, the control module 15 includes the engine stop/start control module 40 for controlling the operation of the engine stop/start system 14. The engine stop/start control module 40 includes the engine damping module 44, a solenoid control module 46 and a motor control module 48. The solenoid control module 46 actuates and de-actuates the solenoid 24 to control the engagement between the pinion gear 20 and the flywheel ring gear 32. The motor control module 48 that may include a power relay controls power input to the starter motor 18. The engine damping module 44 communicates with the solenoid control module 46, a stop request 51, and the engine speed sensor 42.

When the engine stop/start control module 40 receives a start request 49, the solenoid control module 46 actuates the solenoid 24 to move the pinion gear 20 to engage the flywheel ring gear 32. The motor control module 48 may supply power to the starter motor 18. The starter motor 18 may be actuated to drive the pinion gear 20, the flywheel ring gear 32, and the crankshaft 34, to start the engine 11. After the engine 11 is started, the solenoid 24 is de-activated and the pinion gear 20 disengages from the flywheel ring gear 32. The starter motor 18 is deactivated.

The solenoid 24 and the starter motor 18 may be controlled independently and separately by the solenoid control module 46 and the motor control module 48, respectively. One example of the method of independently controlling the solenoid 24 and the starter motor 18 to achieve a quick engine start is described in U.S. Pat. No. 7,218,010, assigned to the assignee of the present application, the disclosure of which is incorporated herein by reference in its entirety.

When the engine stop/start control module 40 receives a stop request, the control module 15 controls the engine 11 to reduce the engine speeds. When the engine damping module 44 determines that the engine speed is reduced to a predetermined rotational speed, the engine damping module 44 sends a signal to the solenoid control module 46. The solenoid control module 46 may then actuate the solenoid 24 to move the pinion gear 20 to engage the flywheel ring gear 32. When the pinion gear 20 engages the flywheel ring gear 32, the overrunning clutch 38 that is mounted on the armature shaft 22 communicates with the flywheel ring gear 32 and the engine 11. The starter motor 18 is in an electrically de-activated state. As the crankshaft 34 continues to rotate in the forward direction (i.e., normal direction), the overrunning clutch 38 is disengaged and slips relative to the pinion gear 20, thereby preventing the torque from being transmitted from the engine 11 to the armature of the starter motor 18.

When the engine 11 stops and if the crankshaft 34 starts to rotate in a reverse direction, the one-way overrunning clutch 38 is engaged, thereby connecting the armature of the starter motor 18 to the engine 11. The starter motor 18 is still electrically deactivated. The pinion gear 20, the mechanical overrunning clutch 38, the armature of the starter motor 18 and associated components (for example only, armature bearings) apply a significant load to the crankshaft 34 due to their rotational inertia and friction between stationary and rotating components. The static friction of the armature bearings and armature's inertia presented to the engine 11 are multiplied by the gear ratio of the flywheel ring gear 32 to the pinion gear 32. The inertia presented to the engine 11 to inhibit reverse rotation is the motor inertia multiplied by the square of the gear ratio of the flywheel ring gear 32 to the pinion gear 20. Therefore, the connection between the armature of the starter motor 18 and the crankshaft 34 at engine stop inhibits or greatly reduces movement of the crankshaft 34 in the reverse direction.

For example, due to the engagement between the pinion gear 20 and the flywheel ring gear 32, the gear ratio may be multiplied by, by way of example, 15:1. In a simpler fashion, the starter friction presented to the engine is multiplied by 15 in this example. The engine load from the starter motor inertia may be increased by square of that gear ratio, by way of example, 225:1, when the engine tries to rotate in a reverse direction. The increased load to the crankshaft may be sufficient to operate against a force, if any, from the compressed charge in the cylinder that is in a compression stroke to prevent the crankshaft from rotating an appreciable distance in reverse direction. This increased load works as a powertrain-contained brake to inhibit the crankshaft 34 from rotating an appreciable distance in a reverse rotation.

After the engine 11 is off, the pinion gear 20 remains engaged with the flywheel ring gear 32, ready for a subsequent restart.

The predetermined engine speed at which the pinion gear 20 engages the flywheel ring gear 32 may vary depending on design of the engine stop/start system 14. The pinion gear 20 may engage the flywheel ring gear 32 at any rotational speeds as long as the engagement between the pinion gear 20 and the flywheel ring gear 32 does not cause damage, excessive wear, or noise to the engine stop/start system 14. The predetermined engine speed may depend on pinion gear lead-in design, the pinion to ring gear ratio, and the maximum over-speed of the engine stop/start system 14. Depending on the design of the engine stop/start system 14, the predetermined engine speed may be, for example only, in a range of slightly above zero to 200 RPM. Advantageously, the pinion gear 20 may engage the flywheel ring gear 32 at an engine speed as low as possible while allowing the speed sensor 42 to accurately measure the rotational speed of the crankshaft 34. Advantageously, the predetermined engine speed may be, for example only, 30 RPM.

Figure 3:
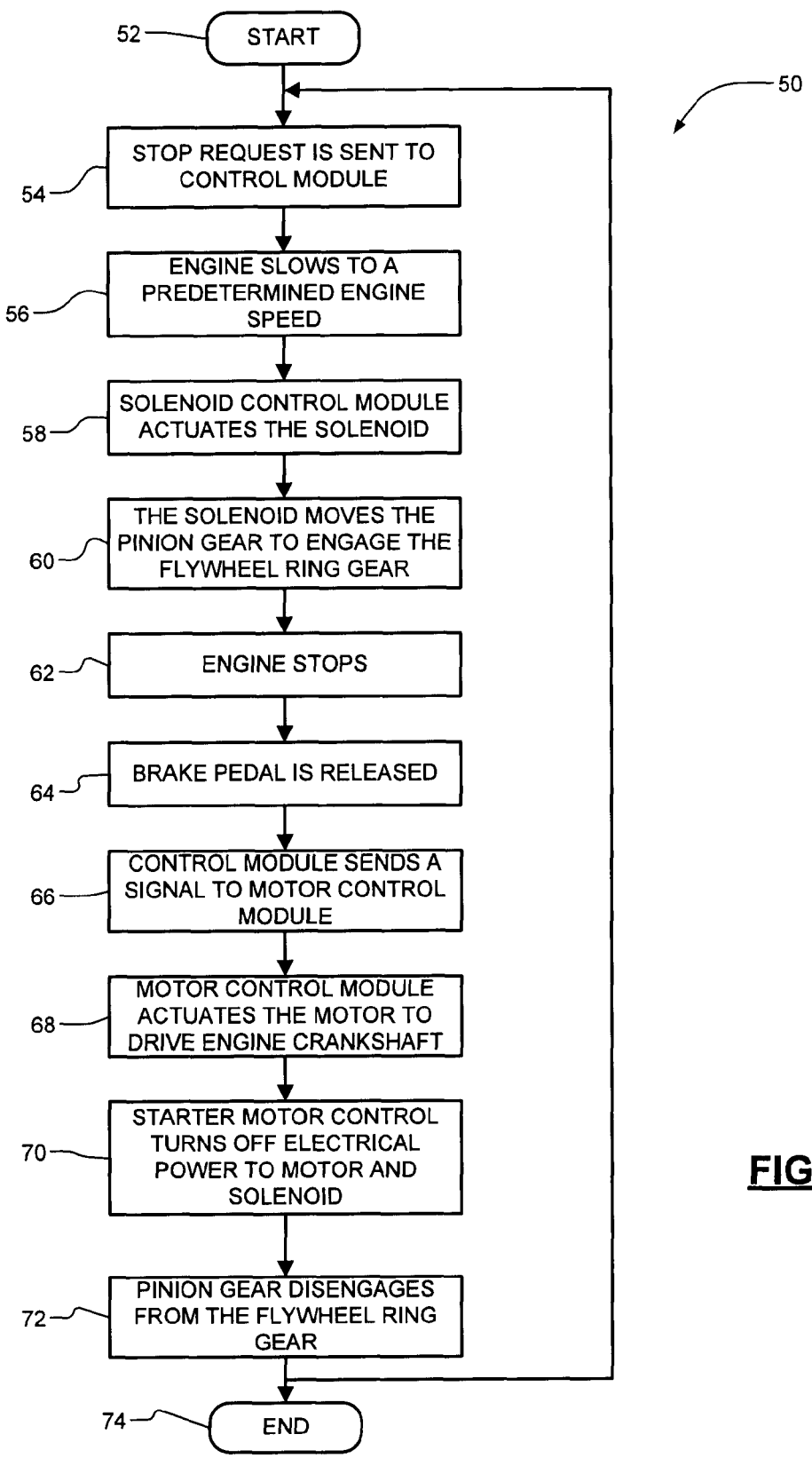
FIG. 3 is a flow diagram of an engine stop/start method in accordance with the teachings of the present disclosure.

Referring to FIG. 3, an engine stop/start method 50 starts at step 52. When a brake pedal (not shown) is depressed in preparation for a stop, a stop request 51 is sent to the control module 15 in step 54. In response to the stop request 51, the engine speed is slowed and the engine damping module 44 is activated. In step 56, as the engine 11 is slowed to a predetermined engine speed, by way of example only, 30 RPM, the engine damping module 44 may send a signal to the solenoid control module 46. In step 58, the solenoid control module 46 actuates the solenoid 24. The actuation of the solenoid 24 moves the pinion gear 20 to engage the flywheel ring gear 32 in step 60. The overrunning clutch 38 is coupled to the flywheel ring gear 32, but by arrangement does not transfer torque because the crankshaft is rotating in the normal direction.

The engine 11 stops in step 62. When the engine 11 stops and if the crankshaft 34 changes rotational direction (i.e. rotate in a reverse direction), the overrunning clutch 38 becomes engaged to connect the armature of the starter motor 18 to the engine 11, thereby applying a significant load to the crankshaft 34. This load prevents the crankshaft from rotating in a reverse direction and/or applies damping to the engine 11. After the engine 11 stops, the pinion gear 20 remains engaged with the flywheel ring gear 32, ready for a subsequent engine start.

To restart the engine 11, the operator or driver of the vehicle may send a start request 49 to the control module 15 by releasing the brake pedal in step 64. The control module 15 then sends a signal to the motor control module 48 in step 66. The motor control module 48 actuates the starter motor 18 to drive the pinion gear 20, the flywheel ring gear 32, and the crankshaft 34 to restart the engine 11 in step 68. After the engine 11 is started, the control module 15 may command the solenoid control module 46 and the motor control module 48 to electrically deactivate the solenoid 24 and the starter motor 18 in step 70. As a result, the pinion gear 20 is moved back to its original position to disengage from the flywheel ring gear 32 in step 72. The whole process may be repeated when a stop request 51 is received and the engine 11 is slowed to the predetermined engine speed. The whole process ends at step 74.

While the engine stop/start system and method are advantageous for a hybrid vehicle which requires frequent stops and restarts, the engine stop/start system and method can be used in a non-hybrid vehicle for greatly limiting crankshaft reversal at engine stop. For example, in another hybrid propulsion system, the motor generator 13 may be connected to a shaft of the transmission 12 rather than the engine 11. The motor generator 13 may only be a generator for simple hybrid vehicles or for non-hybrid vehicles. For non-hybrid vehicles, batteries 16 and 36 may be combined into a single battery connected to the generator 13, the starter motor 18, and the control module 15.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of operating an engine stop/start system comprising:
   receiving an engine stop request;
   reducing a forward speed of an engine in response to the engine stop request; and
   when the forward speed of the engine is equal to a predetermined engine speed that is greater than zero during the engine stop request and prior to receiving an engine start request, selectively connecting an armature of a starter motor to a flywheel ring gear of the engine via a mechanical overrunning clutch and a pinion gear.

2. The method of claim 1 wherein the predetermined engine speed is in a range of above zero and below 200 RPM.

3. The method of claim 1 further comprising maintaining engagement between the pinion gear and the flywheel ring gear after the engine is shut off.

4. An engine stop/start control system comprising:
   an engine speed sensor that measures an engine speed; and
   an engine damping module that:
      communicates with the engine speed sensor, and
      during an engine stop request, slows a forward engine speed of the engine and generates a first signal during the engine stop request when the forward speed of the engine is equal to a predetermined engine speed that is greater than zero; and
   a solenoid control module that, in response to the first signal during the engine stop request and prior to receiving an engine start request, selectively connects an armature of a starter motor to a flywheel ring gear of the engine via a mechanical overrunning clutch and a pinion gear.

5. The engine stop/start control system of claim 4 wherein the predetermined engine speed is in a range of above zero and below 200 RPM.

6. The engine stop/start control system of claim 4 further comprising a motor control module that selectively actuates and de-actuates a starter motor, wherein the starter motor and the solenoid are controlled independently and separately.

7. The engine stop/start control system of claim 4, wherein the solenoid control module maintains engagement between the pinion gear and the flywheel ring gear after the engine is shut off.

* * * * *